Oct. 18, 1938.   W. MILLWARD   2,133,751
METHOD OF MAKING ORE DUST BRIQUETTES
Filed June 16, 1936
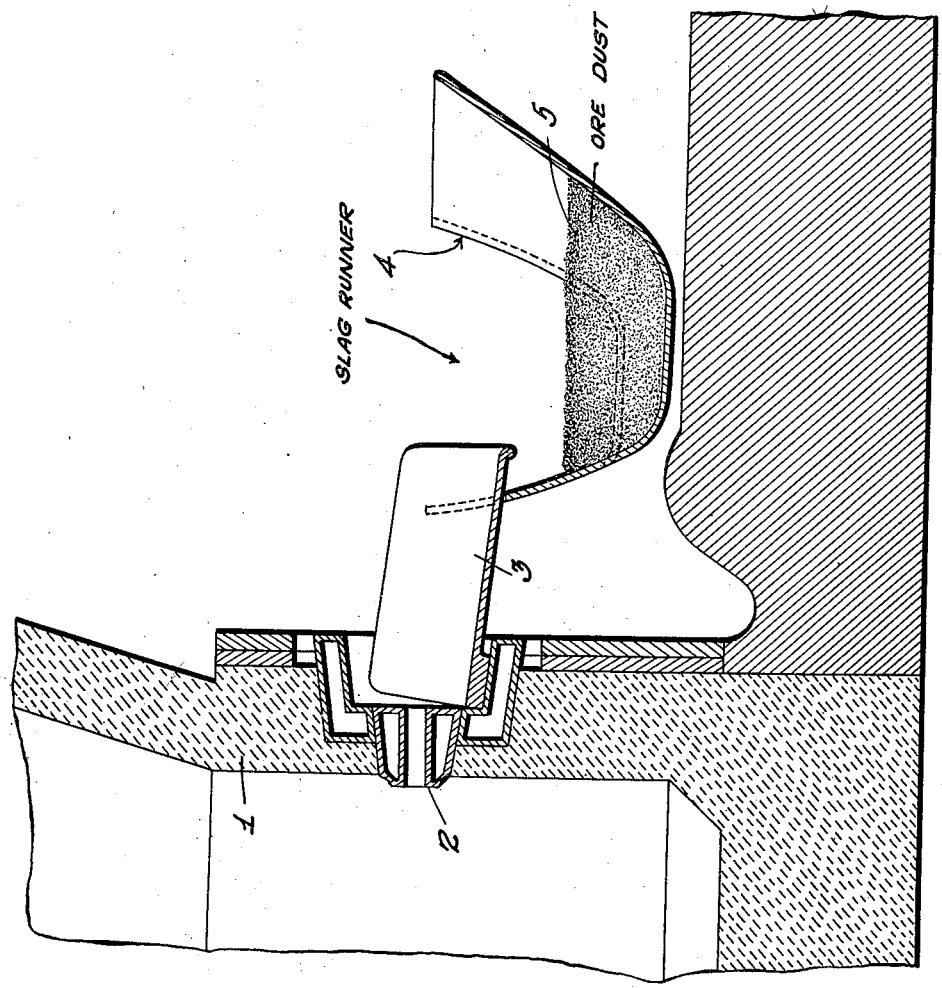
Inventor:
William Millward
By D. P. Wollhauser
Attorney Patented Oct. 18, 1938

2,133,751

UNITED STATES PATENT OFFICE 2,133,751

METHOD OF MAKING ORE DUST BRIQUETTES

William Millward, Pittsburgh, Pa.

Application June 16, 1936, Serial No. 85,545

1 Claim. (Cl. 75—3)

This invention relates to a novel method producing finished slag briquettes in an economical manner and in shapes and sizes whereby the same can be advantageously made available for general use in blast or other metallurgical furnaces.

To that end the procedure observed in practicing the invention consists first in placing iron ore dust in pockets or depressions provided in the slag runner adjacent to the cinder monkey of a steel plant. Then the molten slag from the furnace is directed into the slag runner and as this molten slag passes over the pockets or depressions holding the ore dust it gathers up the ore dust and carries the same therewith to the slag ladles. Then the molten slag having incorporated therewith the ore dust is allowed to cool to a dusky red at approximately the temperature of 600° F. at which time it is dumped into a water bosh causing the hot substance automatically to be broken into briquette particles of such sizes and shapes as to be readily available for use in blast or other metallurgical furnaces.

The figure of the drawing forming a part of this application illustrates diagrammatically that part of a crucible furnace with which the present invention is associated. Referring to this drawing the numeral I designates the lower wall portion of a crucible furnace through which the slag is discharged. In this wall portion is fitted the usual cinder notch or cinder monkey 2 through which the accumulated slag is drawn off, and the numeral 3 designates the usual slag discharging chute or spout arranged outside of the furnace wall and receiving the molten slag from the cinder notch or monkey and delivering it into the usual slag runner 4 which ordinarily is made in lengths of from four to eight feet. According to the present invention the slag runner is provided or formed, adjacent the location of the cinder notch or monkey, with an ore dust pocket or depression 5 in open communication with the trough through the slag runner 4 and in which is adapted to be kept a supply of the ore dust. Accordingly, as the molten slag is discharged from the chute or spout 3 it gathers up a content of ore dust in the manner and for the purpose herein described. It will be understood that the slag runner may be formed within its length with additional pockets or depressions similar to the pocket or depression 5, if so desired.

I claim:

A method of making iron ore briquettes which consists first in maintaining a quantity of iron ore dust in the line of flow of molten slag into and through the slag runner of a furnace, flowing the molten slag into and through the slag runner and onto and over the ore dust therein, subsequently causing the molten body of slag containing the ore dust to cool to a temperature of approximately 600° F. and finally subjecting the cooled and congealed material to contact with water thereby breaking up the same into briquette particles.

WILLIAM MILLWARD.